United States Patent
Lim et al.

(10) Patent No.: US 10,070,135 B2
(45) Date of Patent: *Sep. 4, 2018

(54) ENCODING/DECODING APPARATUS AND METHOD USING FLEXIBLE DEBLOCKING FILTERING

(71) Applicant: SK TELECOM CO., LTD., Seoul (KR)

(72) Inventors: Jeongyeon Lim, Seongnam-si (KR); Joong Gunn Park, Suwon-si (KR); Byeungwoo Jeon, Seongnam-si (KR); Joohee Moon, Seoul (KR); Yunglyul Lee, Seoul (KR); Haekwang Kim, Seoul (KR); Jongki Han, Seoul (KR); Jung Youp Yang, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 443 days.

This patent is subject to a terminal disclaimer.

(21) Appl. No.: 14/919,080

(22) Filed: Oct. 21, 2015

(65) Prior Publication Data

US 2016/0044316 A1 Feb. 11, 2016

Related U.S. Application Data

(63) Continuation of application No. 14/159,736, filed on Jan. 21, 2014, now Pat. No. 9,554,139, which is a (Continued)

(30) Foreign Application Priority Data

Jul. 22, 2011 (KR) .................. 10-2011-0073306
Sep. 15, 2011 (KR) .................. 10-2011-0093139

(51) Int. Cl.
H04N 19/14 (2014.01)
H04N 19/176 (2014.01)
(Continued)

(52) U.S. Cl.
CPC ........... *H04N 19/14* (2014.11); *H04N 19/117* (2014.11); *H04N 19/172* (2014.11); (Continued)

(58) Field of Classification Search
None
See application file for complete search history.

(56) References Cited

U.S. PATENT DOCUMENTS 8,553,771 B2  10/2013  Park et al.
8,649,431 B2  2/2014  Cheon et al.
(Continued)

FOREIGN PATENT DOCUMENTS

CN  101040532 A  9/2007
JP  2009089267 A  4/2009
(Continued)

OTHER PUBLICATIONS

Chinese Office Action dated Aug. 1, 2016 in connection with the counterpart Chinese Patent Application No. 201180072461.4.
(Continued)

*Primary Examiner* — Mohammad J Rahman
(74) *Attorney, Agent, or Firm* — Hauptman Ham, LLP

(57) ABSTRACT

A video decoding method performed by a video decoding apparatus includes: generating a quantized frequency transform block by decoding a bitstream; reconstructing a residual block by inversely quantizing and inversely transforming the quantized frequency transform block; generating a prediction block corresponding to a current block; reconstructing the current block by adding the generated prediction block to the reconstructed residual block; and performing a deblocking filtering with respect to a boundary between subblocks within a frame including the reconstructed current block, by allowing numbers of filtered pixels in a first block of the subblocks and a second block of
(Continued)

the subblocks that engage in the filtering to be different depending on one or more predetermined criterion.

3 Claims, 7 Drawing Sheets

Related U.S. Application Data continuation of application No. PCT/KR2011/006823, filed on Sep. 15, 2011.

(51) Int. Cl.
| | |
|---|---|
| *H04N 19/60* | (2014.01) |
| *H04N 19/182* | (2014.01) |
| *H04N 19/172* | (2014.01) |
| *H04N 19/117* | (2014.01) |
| *H04N 19/44* | (2014.01) |
| *H04N 19/86* | (2014.01) |

(52) U.S. Cl.
CPC ......... *H04N 19/176* (2014.11); *H04N 19/182* (2014.11); *H04N 19/44* (2014.11); *H04N 19/60* (2014.11); *H04N 19/86* (2014.11)

(56) References Cited

U.S. PATENT DOCUMENTS

| | | | |
|---|---|---|---|
| 9,077,971 B2 | 7/2015 | Ye et al. | |
| 9,264,721 B2 | 2/2016 | Kim et al. | |
| 9,554,139 B2 | 1/2017 | Lim et al. | |
| 2006/0146941 A1 | 7/2006 | Cha et al. | |
| 2007/0286283 A1 | 12/2007 | Yin et al. | |
| 2009/0257501 A1* | 10/2009 | Ye | H04N 19/46 375/240.16 |
| 2010/0142844 A1* | 6/2010 | Pereira | G06T 5/002 382/261 |
| 2010/0284464 A1 | 11/2010 | Nagori et al. | |
| 2013/0322548 A1* | 12/2013 | Narroschke | H04N 19/176 375/240.24 |
| 2013/0329814 A1* | 12/2013 | Norkin | H04N 19/00909 375/240.29 |
| 2014/0003541 A1 | 1/2014 | Park et al. | |
| 2016/0044316 A1* | 2/2016 | Lim | H04N 19/176 375/240.12 |

FOREIGN PATENT DOCUMENTS

| | | |
|---|---|---|
| KR | 10-2008-0056083 A | 6/2008 |
| KR | 10-2009-0095014 A | 9/2009 |
| KR | 1020100029343 A | 3/2010 |
| KR | 10-2010-0045007 A | 5/2010 |
| KR | 1020100079037 A | 7/2010 |
| KR | 10-2011-0004430 A | 1/2011 |
| KR | 10-1834541 B1 | 3/2018 |

OTHER PUBLICATIONS

International Search Report dated May 8, 2012 for PCT/KR2011/006823.
Korean Notice of Allowance dated Feb. 2, 2018 in connection with the counterpart Korean Patent Application No. 10-2011-0093139.
Korean Office Action dated Mar. 19, 2018 in connection with the counterpart Korean Patent Application No. 10-2018-0023126.

* cited by examiner

|       | $p_{3,0}$ | $p_{2,0}$ | $p_{1,0}$ | $p_{0,0}$ | $q_{0,0}$ | $q_{1,0}$ | $q_{2,0}$ | $q_{3,0}$ |       |
|-------|-----------|-----------|-----------|-----------|-----------|-----------|-----------|-----------|-------|
|       | $p_{3,1}$ | $p_{2,1}$ | $p_{1,1}$ | $p_{0,1}$ | $q_{0,1}$ | $q_{1,1}$ | $q_{2,1}$ | $q_{3,1}$ |       |
|       | $p_{3,2}$ | $p_{2,2}$ | $p_{1,2}$ | $p_{0,2}$ | $q_{0,2}$ | $q_{1,2}$ | $q_{2,2}$ | $q_{3,2}$ |       |
| Block | $p_{3,3}$ | $p_{2,3}$ | $p_{1,3}$ | $p_{0,3}$ | $q_{0,3}$ | $q_{1,3}$ | $q_{2,3}$ | $q_{3,3}$ | Block |
| P     | $p_{3,4}$ | $p_{2,4}$ | $p_{1,4}$ | $p_{0,4}$ | $q_{0,4}$ | $q_{1,4}$ | $q_{2,4}$ | $q_{3,4}$ | Q     |
|       | $p_{3,5}$ | $p_{2,5}$ | $p_{1,5}$ | $p_{0,5}$ | $q_{0,5}$ | $q_{1,5}$ | $q_{2,5}$ | $q_{3,5}$ |       |
|       | $p_{3,6}$ | $p_{2,6}$ | $p_{1,6}$ | $p_{0,6}$ | $q_{0,6}$ | $q_{1,6}$ | $q_{2,6}$ | $q_{3,6}$ |       |
|       | $p_{3,7}$ | $p_{2,7}$ | $p_{1,7}$ | $p_{0,7}$ | $q_{0,7}$ | $q_{1,7}$ | $q_{2,7}$ | $q_{3,7}$ |       |

↑
Block Boundary *(202)*

*FIG. 2*

|       | p₃,₀ | p₂,₀ | p₁,₀ | p₀,₀ | q₀,₀ | q₁,₀ | q₂,₀ | q₃,₀ |       |
|-------|------|------|------|------|------|------|------|------|-------|
|       | p₃,₁ | p₂,₁ | p₁,₁ | p₀,₁ | q₀,₁ | q₁,₁ | q₂,₁ | q₃,₁ |       |
|       | p₃,₂ | p₂,₂ | p₁,₂ | p₀,₂ | q₀,₂ | q₁,₂ | q₂,₂ | q₃,₂ |       |
| Block | p₃,₃ | p₂,₃ | p₁,₃ | p₀,₃ | q₀,₃ | q₁,₃ | q₂,₃ | q₃,₃ | Block |
| P     | p₃,₄ | p₂,₄ | p₁,₄ | p₀,₄ | q₀,₄ | q₁,₄ | q₂,₄ | q₃,₄ | Q     |
|       | p₃,₅ | p₂,₅ | p₁,₅ | p₀,₅ | q₀,₅ | q₁,₅ | q₂,₅ | q₃,₅ |       |
|       | p₃,₆ | p₂,₆ | p₁,₆ | p₀,₆ | q₀,₆ | q₁,₆ | q₂,₆ | q₃,₆ |       |
|       | p₃,₇ | p₂,₇ | p₁,₇ | p₀,₇ | q₀,₇ | q₁,₇ | q₂,₇ | q₃,₇ |       |

↑ Block Boundary

*FIG. 5*

|       | p₃,₀ | p₂,₀ | p₁,₀ | p₀,₀ | q₀,₀ | q₁,₀ | q₂,₀ | q₃,₀ |       |
|-------|------|------|------|------|------|------|------|------|-------|
|       | p₃,₁ | p₂,₁ | p₁,₁ | p₀,₁ | q₀,₁ | q₁,₁ | q₂,₁ | q₃,₁ |       |
|       | p₃,₂ | p₂,₂ | p₁,₂ | p₀,₂ | q₀,₂ | q₁,₂ | q₂,₂ | q₃,₂ |       |
| Block | p₃,₃ | p₂,₃ | p₁,₃ | p₀,₃ | q₀,₃ | q₁,₃ | q₂,₃ | q₃,₃ | Block |
| P     | p₃,₄ | p₂,₄ | p₁,₄ | p₀,₄ | q₀,₄ | q₁,₄ | q₂,₄ | q₃,₄ | Q     |
|       | p₃,₅ | p₂,₅ | p₁,₅ | p₀,₅ | q₀,₅ | q₁,₅ | q₂,₅ | q₃,₅ |       |
|       | p₃,₆ | p₂,₆ | p₁,₆ | p₀,₆ | q₀,₆ | q₁,₆ | q₂,₆ | q₃,₆ |       |
|       | p₃,₇ | p₂,₇ | p₁,₇ | p₀,₇ | q₀,₇ | q₁,₇ | q₂,₇ | q₃,₇ |       |

↑ Block Boundary

*FIG. 6*

ENCODING/DECODING APPARATUS AND METHOD USING FLEXIBLE DEBLOCKING FILTERING

CROSS-REFERENCE TO RELATED APPLICATIONS

The present application is a continuation of U.S. patent application Ser. No. 14/159,736 filed Jan. 21, 2014, which is a continuation of PCT/KR2011/006823, filed Sep. 15, 2011, which is based on and claims priorities to Korean Patent Application No. 10-2011-0073306, filed on Jul. 22, 2011 and Korean Patent Application No. 10-2011-0093139, filed on Sep. 15, 2011. The disclosures of above-listed applications are hereby incorporated by reference herein in their entirety.

TECHNICAL FIELD

The present disclosure relates to a method and an apparatus, which encode and/or decode a video by using flexible deblocking filtering.

BACKGROUND

The statements in this section merely provide background information related to the present disclosure and may not necessarily constitute prior art.

Moving Picture Experts Group (MPEG) and Video Coding Experts Group (VCEG) together stepped ahead of the existing MPEG-4 Part 2 and H.263 standard methods to develop a different video compression standard. The new standard is called H.264/AVC (Advanced Video Coding) and was released simultaneously as MPEG-4 Part 10 AVC and ITU-T Recommendation H.264.

In the H.264/AVC standard, an intra/inter prediction process is performed, in units of a block having various shapes of subblocks, to generate a residual signal. A transform and a quantization step are performed on the generated residual block to reduce the number of bits of the generated residual block before entering an encoding operation. A macroblock encoding operation, as viewed from the encoder side, includes dividing an input image into 16×16 macroblock units, performing a prediction on each macroblock (in the level of a subblock sized according to the inter/intra mode) to generate a residual block, processing the generated residual block with an integer transform based on a discrete cosine transform (DCT) in 4×4 or 8×8 unit to generate frequency coefficients, and quantizing the frequency coefficients according to a quantization parameter (QP). Afterwards, blocking artifacts resulting from the transform and quantization process, may be reduced by using a deblocking filtering.

The inventor(s) has noted that in order to remove the blocking artifacts, an algorithm is used to improve the subjective/objective performance of the image by performing a more efficient deblocking filtering.

SUMMARY

In accordance with some embodiments of the present disclosure, a video decoding method performed by a video decoding apparatus comprises generating a quantized frequency transform block by decoding a bitstream; reconstructing a residual block by inversely quantizing and inversely transforming the quantized frequency transform block; generating a prediction block corresponding to a current block; reconstructing the current block by adding the generated prediction block to the reconstructed residual block; and performing a deblocking filtering with respect to a boundary between subblocks within a frame including the reconstructed current block, by allowing numbers of filtered pixels in a first block of the subblocks and a second block of the subblocks that engage in the filtering to be different depending on one or more predetermined criterion.

BRIEF DESCRIPTION OF DRAWINGS

FIG. 2 is an exemplary diagram of block P and block Q subject to a deblocking filtering according to at least one embodiment;

FIG. 5 is an exemplary diagram of a degree of linearity determination in block units according to at least one embodiment;

FIG. 6 is an exemplary diagram of a degree of linearity determination in block units according to at least one embodiment;

DETAILED DESCRIPTION

Figure 1:
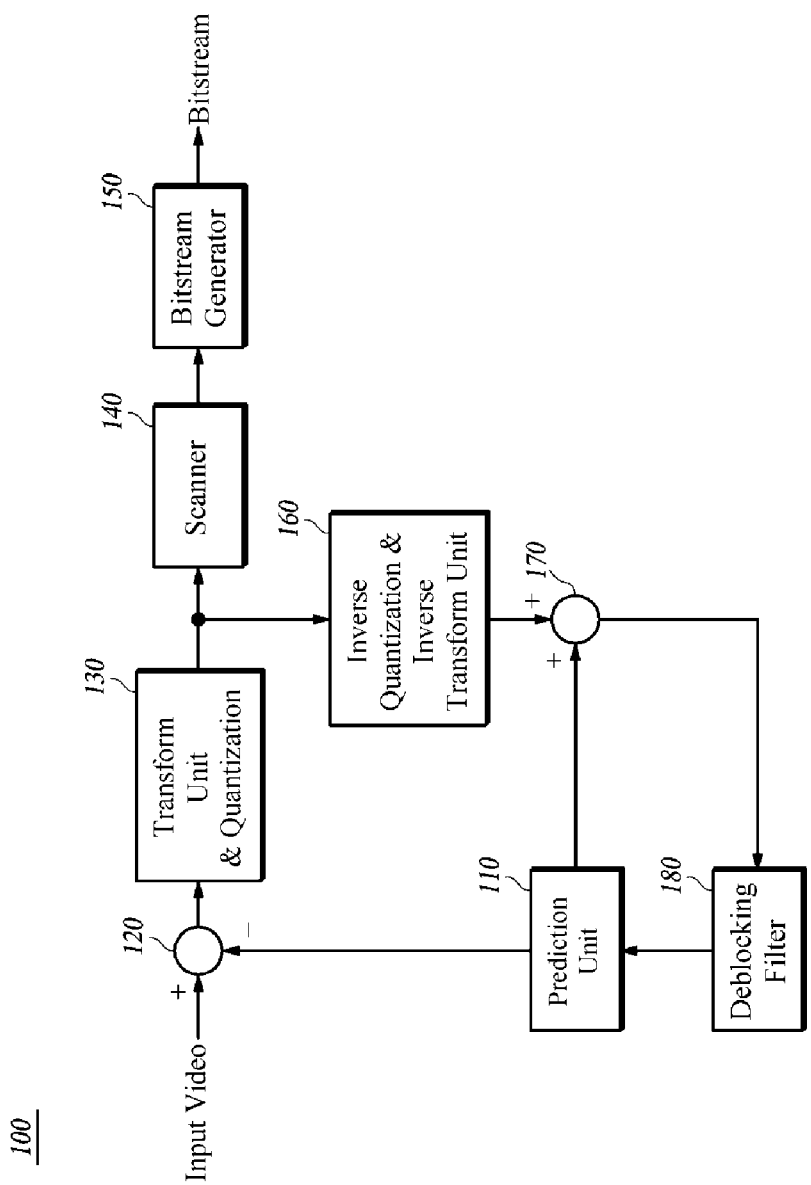
FIG. 1 is a block diagram of a configuration of a video encoding apparatus according to at least one embodiment.

Hereinafter, at least one embodiment of the present disclosure will be described in detail with reference to the accompanying drawings. In the following description, like reference numerals designate like elements although the reference numerals are shown in different drawings. Further, in the following description of the present embodiments, a detailed description of known functions and/or configurations incorporated herein will be omitted for the purpose of clarity and for brevity.

Additionally, in describing various components of the present disclosure, terms like first, second, A, B, (a), and (b) are used solely for the purpose of differentiating one component from another, but one of ordinary skill would understand the terms do not imply or suggest the substances, order or sequence of the components. If a component is described as 'connected', 'coupled', or 'linked' to another component, one of ordinary skill would understand the components are not necessarily directly 'connected', 'coupled', or 'linked' but also are indirectly 'connected', 'coupled', or 'linked' via at least one additional third component.

Hereinafter, a video encoding apparatus and/or a video decoding apparatus in accordance with some embodiments described below may be user terminals such as a personal computer (PC), a notebook computer, a tablet, a personal digital assistant (PDA), a game console, a portable multimedia player (PMP), a PlayStation Portable (PSP), a wireless communication terminal, a smart phone, a TV, a media player, and the like. A video encoding apparatus and/or a video decoding apparatus according to one or more embodiments may correspond to server terminals such as an application server, a service server and the like. A video encoding apparatus and/or a video decoding apparatus according to one or more embodiments may correspond to various apparatuses each including (a) a communication unit apparatus such as a communication modem and the like for performing communication with various types of devices or a wired/wireless communication network, (b) a memory for storing various types of programs and data for encoding or decoding a video, or performing an inter or intra prediction for the encoding or decoding, and (c) a microprocessor and the like for executing the program to perform an operation and control. According to one or more embodiments, the memory comprises a computer-readable recording/storage medium such as a random access memory (RAM), a read only memory (ROM), a flash memory, an optical disk, a magnetic disk, a solid-state disk, and the like. According to one or more embodiments, the microprocessor is programmed for performing one or more of operations and/or functionality described herein. According to one or more embodiments, the microprocessor is implemented, in whole or in part, by specifically configured hardware (e.g., by one or more application specific integrated circuits or ASIC(s)).

Further, a video encoded into a bitstream by the video encoding apparatus may be transmitted in real time or non-real-time to the video decoding apparatus through wired/wireless communication networks such as the Internet, wireless short range or personal area network (WPAN), wireless local area network (WLAN), WiBro (wireless broadband, aka WiMax) network, mobile communication network and the like or through various communication interfaces such as a cable, a universal serial bus (USB) and the like. According to one or more embodiments, the bit stream is decoded in the video decoding apparatus and reconstructed and reproduced as the video. According to one or more embodiments, the bit stream is stored in a computer-readable recording/storage medium.

FIG. 1 is a block diagram of an arrangement of a video encoding apparatus 100 according to at least one embodiment.

The video encoding apparatus 100 according to at least one embodiment includes a predictor 110, a subtracter 120, a transformer and quantizer 130, a scanner 140, a bitstream generator 150, an inverse quantizer and inverse transformer 160, an adder 170, and a deblocking filter 180. An input image to be encoded may be entered in units of blocks. In some embodiments, the shape of the block can be M×N where M and N are each a natural number of 2n (where n is an integer of 1 or larger). In some embodiments, M and N each can be greater than 16 or different from each other or the same. In some embodiments, each frame, to be encoded, can have a different shape of blocks, and then video encoding apparatus 100 is configured to encode information of the different block types, frame by frame, such that a video decoding apparatus configured to decode the encoded data will know the shape of blocks of a frame to be decoded. In some embodiments, the video encoding apparatus 100 is configured to determine one or more shape of blocks for use by selecting the most efficient block shape from one or more shapes of blocks obtained by encoding the current frame or making a block shape selection according to an analysis of the frame characteristics.

In some embodiments, if the image of a frame has a higher correlation in the horizontal direction, horizontal elongated blocks can be selected. For example, with a higher correlation in the vertical direction, vertically elongated blocks can be selected.

In some embodiments, video encoding apparatus 100 may further include a block type determiner (not shown), which is configured to determine a block type and is configured to encode and include information on the block type in the encoded data.

In some embodiments, the video encoding apparatus 100 comprises the predictor 110, subtracter 120, transformer and quantizer 130, scanner 140, bitstream generator 150, inverse quantizer and transformer 160, and adder 170.

The predictor 110 is configured to generate a predicted block from the input image. In some embodiments, the predictor 110 is configured to predict the block to be currently encoded (hereinafter, referred to as current block) from the input image. In other words, the predictor 110 predicts the current block of the input image by using intra, inter or other predictions and thereby, generates a predicted block, which has predicted pixel values for the respective pixel values.

In some embodiments, in order to optimize the predicted pixel value, the block can be subdivided into smaller shapes of blocks, as needed. In other words, the predicted block can be generated in units of subblocks, subdivided from the block. In some embodiments, the block is an M×N shape that is a square or rectangle, and the subblocks may not exceed the size of the current block, but the subblocks are sized 2p horizontally and 2q vertically, wherein p and q can be the same or different from each other.

The subtractor 120 subtracts the predicted block from the current block to generate a residual block. In other words, the subtractor 120 calculates the difference value of the predicted pixel values of the respective pixels of the predicted block from the original pixel values of the current block, to generate a residual block having a residual signal.

The transformer and quantizer 130 determines one or more transform and quantization types according to the block type of the current block, and performs the transform and quantization operations on the residual block according to the determined transform and quantization types.

In some embodiments, the current block, predicted block or residual block may be different in size from a transform block that is subject to the transform and quantization operations. In some embodiments, the size of the transform block for the transform and quantization operations is selected in a range that does not exceed the size of the residual block. In some embodiments, the transform block size may be selected to exceed the residual block size. In some embodiments, the transform block is a block that is a unit of the transform and comprises one or more transform coefficients or one or more pixel values. For example, the transform block refers to an R×S transform coefficient block, which is encoded by an R×S sized transform or refers to an R×S pixel block, which is decoded with an R×S sized inverse transform.

The video encoding apparatus 100 according to some embodiments performs the residual block transform with multiple transform sizes, including 4×4, 8×4, 4×8, 8×8, 16×8, 8×6 or 16×16, before selecting the most efficient transform for encoding.

For example, if the intra-prediction or inter-prediction is performed by a 16×16 block unit, one or more of the current block, prediction block or residual block may be commonly sized as 16×16. In this example, upon receiving the 16×16 residual block, the transform and quantization unit 130 divides the 16×16 residual block into two 16×8 subblocks, and then carries out a 16×8 transform to output a pair of 16×8 transform coefficient blocks.

The transform and quantization unit 130 transforms a residual signal of the residual block into the frequency domain to generate a residual block having transform coefficients, and then quantizes the residual block having transform coefficients to generate a transformed and quantized residual block having quantized transform coefficients.

In some embodiments, the transform method may be the Hadamard transform, discrete cosine transform based integer transform (hereinafter abbreviated as integer transform) or other such techniques for transforming image signals in spatial domain into the frequency domain. In some embodiments, the quantization method includes the dead zone uniform threshold quantization (hereinafter abbreviated as 'DZUTQ'), quantization weighted matrix and various other methods.

The scanner 140 scans the quantized transform coefficients of the residual block (transformed and quantized by the transform and quantization unit 130) to generate a string of quantized transform coefficients. In some embodiments, scanner 140 accounts for the transform scheme, quantization scheme and characteristics of a block (current block or subblock). In some embodiments, a sequence of scanning is determined by the scanner 140 to provide the shortest possible string of quantized transform coefficients after scanning. In some embodiments, the scanner 140 may be omitted from FIG. 1 and the operations of scanner 140 are incorporated into the bitstream generator 150.

The bitstream generator 150 generates encoded data by encoding the blocks of frequency coefficients that are quantized and transformed. In some embodiments, the bitstream generator 150 encodes the string of quantized transform coefficients generated by scanning the transformed and quantized coefficients from the transform and quantization unit 130 to generate the encoded data. In some embodiments, the bitstream generator 150 encodes the string of quantized transform coefficients generated by the operation of the scanner 140 to generate the encoded data.

The encoding technique of the bitstream generator 150 may use the entropy encoding technique, but it is not limited thereto and various other encoding techniques may also be used. In some embodiments, the bitstream generator 150 can include in the encoded data, not only the encoded bit string from encoding the quantized transform coefficients but also various information required for decoding the encoded bit string. In some embodiments, the various information comprises information on the block type, information on intra prediction modes if the prediction mode is the intra prediction mode, information on a motion vector if the prediction mode is an inter prediction mode, information on the transform and quantization types or the like, including various other information.

The inverse quantization and inverse transform unit 160 performs the inverse quantization and inverse transform, on the frequency coefficient block transformed and quantized by the transform and quantization unit 130, to reconstruct the residual block. In some embodiments, the inverse transform and inverse quantization can be performed by reversing the quantization and transform process performed by the transform and quantization unit 130. In some embodiments, the inverse quantization and transform unit 160 utilizes transform and quantization-related information (for example, information on the transform and quantization types) provided by the quantized and transform unit 130 to carry out the inverse transform and inverse quantization by performing the reverse of the quantization and transform process of the transform and quantization unit 130.

The adder 170 adds the prediction block, predicted by the predictor 110, and the residual block, that is inversely quantized and inversely transformed by the inverse quantization and inverse transform unit 160, to reconstruct the current block.

The deblocking filter 180 performs a deblocking filtering on the reconstructed block from the adder 170. In some embodiments, the deblocking filtering may be carried out block by block or collectively in units of frames or in other various manners. The unit of the deblocking filter of the present disclosure is not limited to the description in at least one embodiment.

The deblocking filter 180 reduces blocking artifacts that occur at the block boundary or transform boundary due to the block-based prediction, transform and quantization of video. In some embodiments, the deblocking filter 180 can perform filtering by using information on the quantization and transform types that is sent along with the reconstructed current block. The information on the quantization and transform types may be transferred to the deblocking filter 180.

For the purpose of filtering from subblock to subblock within a frame containing one or more reconstructed current blocks, the deblocking filter 180 performs a filtering with respect to a boundary between subblocks within a frame including one or more reconstructed current block. In some embodiments, the deblocking filter 180 processes a first subblock and a second subblock involved in the filtering: (a) by allowing a number of pixels filtered in the first subblock and the second subblock to be different depending on a predetermined criteria or (b) by applying one or more different pixel disparity values according to pixel positions relative to the boundary between the first and the second subblocks. In some embodiments, the predetermined criteria may be defined as a linearity of pixel values in a row of pixels in the direction of depth from the boundary between the first and the second subblocks. In some embodiments, the predetermined criteria is a linearity of values of subblocks in the direction of depth from the boundary between the first and the second subblocks. In some embodiments, a frame is the unit by which the deblocking filtering is performed and the frame includes one or more blocks in a set. In some embodiments, the subblock is a predetermined block unit (for example, prediction unit or transform-quantization unit) of a divided block in a frame on which the deblocking is performed. In some embodiments, a block may be a subblock of the frame. In some embodiments, for the deblocking filter 760 in a video decoding apparatus 700, a block may be a subblock of the frame.

In some embodiments, the predetermined criteria in the blocking filter which determines the filtering method comprises the relative sizes of blocks P, Q, or linearity as will be described later. Based on various predetermined criteria, one or more embodiments of the present disclosure can change the number and location of the pixels to be filtered by block basis or row basis.

In some embodiments, in order to eliminate blocking artifacts, the deblocking filter 180 is responsive to a block boundary between two blocks (say M×N macroblocks), a boundary between the transform blocks of R×S transform size determined by the transform and quantization unit 130 and a boundary between a transform block and a block. The shape of the R×S transform block may be a square or rectangle. In some embodiments, the blocking artifacts occur from the transform and quantization performed by the transform unit 130. To eliminate the blocking artifacts, the deblocking filter 180 can be applied to both the block boundary and the transform boundary. As a result, the filtering performed by the blocking filter 180 can be applied to the block or transform boundaries by the forms of the block and transform. In some embodiments, the block boundary is a boundary between two predictions. In some embodiments, the application of the deblocking filtering performed by the blocking filter 180 to the transform boundary and/or the prediction boundary can be implemented during different conditions. In some embodiments, the deblocking filter may not be applied when quantized non-zero transform coefficients are not utilized.

FIG. 2 is a diagram of block P and block Q subject to a deblocking filtering according to one or more embodiments.

For example, referring to FIG. 2, the deblocking filter 180 is described as performing a deblocking filtering operation of the boundary 202 located between block P and block Q. In this example, the deblocking filter operation is performed on the first row of pixels ($p_{3,0} \sim q_{3,0}$). in block P and block Q. In the present disclosure, for simplicity, pixels ($p_{3,0} \sim q_{3,0}$) will be referred to as ($p_3 \sim q_3$). The deblocking filter 180 can perform the deblocking filtering of the single row of pixels $p_{3,0} \sim q_{3,0}$ by modifying the pixels in block P and block Q by the same number and/or same positions. At least one embodiment includes two pixels to modify at either side of the boundary. In at least one embodiment, the pixels included in block P are $p_3$, $p_2$, $p_1$ and $p_0$, and those included in block Q are $q_3$, $q_2$, $q_1$ and $q_0$.

Figure 3:
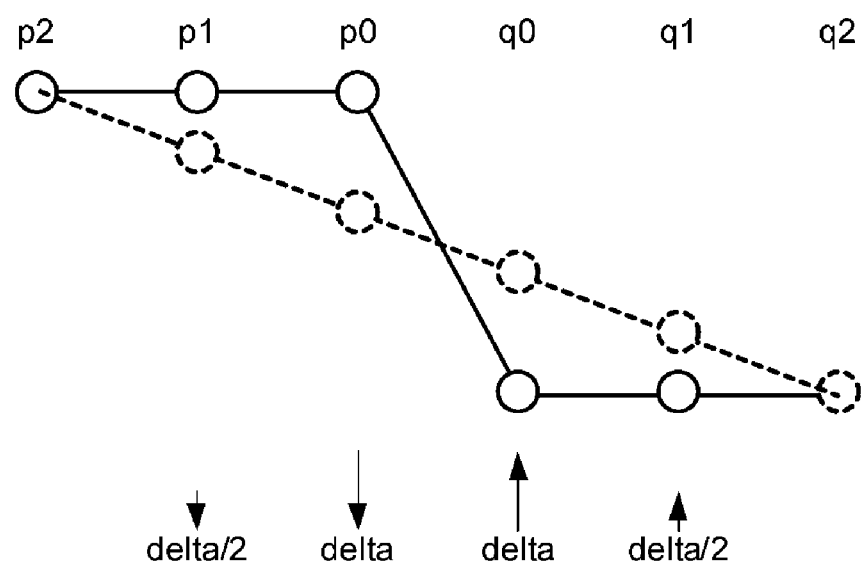
FIG. 3 is an exemplary diagram illustrating an implementation of a deblocking filtering according to at least one embodiment.

FIG. 3 is an exemplary diagram which illustrates a deblocking filtering operation according to at least one embodiment. As shown in FIG. 3, the solid lines connect pixels before the filtering operation and the dotted lines connect the pixels after the filtering operation.

One or more embodiments of the detailed filtering operation of the deblocking filter 180 is as follows.

In some embodiments, the deblocking filter 180 performs the filtering operation by utilizing Equation 1. Equation 1 calculates the value of delta Δ. In some embodiments, the deblocking filter 180 performs the deblocking filtering operation by applying pixel disparities (e.g., Δ and Δ/2) for blocks P and Q in Equation 2.

$$\Delta = \text{Clip3}(-t_c, t_c, (((q_0 - p_0) << 2) + (q_1 - p_1) + 4) >> 3) \quad \text{Equation 1}$$

$$p_1' = p_1 + \Delta/2$$

$$p_0' = p_0 + \Delta$$

$$q_0' = q_0 - \Delta$$

$$q_1' = q_1 - \Delta/2 \quad \text{Equation 2}$$

The function of Clip3 (A, B, x) in Equation 1 is a clipping function which outputs the value B if the value of x is greater than B, outputs the value A if the value of x is less than A, and otherwise outputs the value x. Additionally, $p_0$, $q_0$, $p_1$ and $q_1$ in Equation 1 are pre-filter values and $p_0'$ or $q_0'$, $p_1'$, and $q_1'$, are post-filter values. In Equation 1, "$(q_0 - p_0) << 2$" portion uses the filtering coefficient of 2, which means to shift ($q_0 - p_0$) by two (2) bits to the left side or quadrupling the same and the "($q_1 - p_1$)" portion is multiplied by one (1), and therefore the filtering coefficient is (4, 1). The last part of Equation 1, ">>3" is a 3 bit-shift to the right, and therefore the filtering coefficient may be (4/8, 1/8). Further, in the "($q_1 - p_1$)+4" portion, added value 4 is an offset value for integerizing the filtered result. Accordingly, in some embodiments, (4, 1, 4) or (4/8, 1/8, 4/8) may be regarded as the filter coefficient. These filter coefficients are simply illustrative examples and other filter coefficients than those described in Equation 1 may be used. This also applies to other filters described hereinafter and other coefficients are applicable without restriction to the disclosed equations and filter coefficients. In some embodiments, deblocking filter 180 is configured to perform a deblocking filtering operation by utilizing a same filter coefficient with respect to both of the luminance signal value luma and color-difference signal value chroma.

In some embodiments, employing a higher value of $t_c$ can provide a strong filtering and a lower value thereof can provide a weak filtering, and the value of $t_c$ can be used to adjust the range of pixel disparity. In some embodiments, a filtering parameter as $t_c$ may be predefined by a user, or it may be transmitted from a video encoding apparatus 100 to a video decoding apparatus 700, or it may be a user's preset value which is subsequently readjusted for gradual corrections with appropriate offset values transmitted from the video encoding apparatus 100 to the video decoding apparatus 700. In some embodiments, the offset values may be transmitted to the video decoding apparatus 700 through the deblocking filter 180 or a separate offset value transmitter (not shown).

The delta value Δ determined by Equation 1 is used to obtain the pixel disparity which is then used to change the pixel values as in Equation 2.

Equation 2 is an exemplary implementation which illustrates how the strength of filtering may be adjusted according to predetermined criteria. In the exemplary implementation, the position of the pixel to be filtered is the predetermined criteria, by which (pixel position) different pixel disparities are used to adjust the strength of filtering. Specifically, as pixel disparities, delta is used for a first pixel ($p_0$ or $q_0$) and delta/2 is used for a second pixel ($p_1$ or $q_1$). This ensures disparities to be minimized even when the process of minimizing a disparity in inter-block boundary pixels ($p_0|q_0$) between two blocks P and Q causes a new disparity in in-block pixel boundary ($p_1|p_0$) or ($q_0|q_1$) in P or Q. In other words, minimizing the disparities at the block boundary may in turn cause disparities within a block, which are now minimized according by implementation of the present method.

In some embodiments, to minimize the difference between the pixels ($p_1|p_0$) or ($q_0|q_1$) in the P block or the Q block which can be newly generated in the process of minimizing the difference between the pixels ($p_0$ or $q_0$) on the boundary of the P block or the Q block, new delta values (Δp, Δq) are calculated through a new filtering operation for the pixels ($p_1$ or $q_1$) in the block P or the block Q as shown in Equation 3. The new delta values are applied to the pixels in the P block or the Q block, respectively, in order to performing the deblocking filtering operation.

$$\Delta p = \text{Clip3}(-t_c, t_c, (((p_0 - p_1) << 2) + (q_0 - p_2) + 4) >> 3)$$

$$\Delta q = \text{Clip3}(-t_c, t_c, (((q_1 - q_0) << 2) + (q_2 - p_0) + 4) >> 3) \quad \text{Equation 3}$$

In short, pixel disparity value Δp is used for an internal pixel $p_1$ of the block P, and Δq is used for an internal pixel $q_1$ of the block Q. Aforementioned Equations 1 and 2 is an example of calculating the same delta for both the blocks P and Q, whereas Equation 3 is an example of calculating different values of delta for blocks P and Q, respectively.

In some embodiments, the process of determining the pixel disparity value and adjusting the pixel value may use Equation 2, while allowing the values of delta determined by Equation 3 to be used for the pixels of blocks P and Q. This satisfies $p_0' = p_0 + \text{delta\_p}$, $q_0' = q_0 - \text{delta\_q}$, $p_1' = p_1 + \text{delta\_p}/2$ and $q_1' = q_1 - \text{delta\_q}/2$.

Although the same filter was described as applied to calculating the values of delta shown in Equations 1 and 3, filters of different coefficients may be used for calculating the values of delta to be applied to blocks P and Q respectively.

According to another embodiment of the present disclosure, in performing a deblocking filtering operation for the P/Q block boundary 202 as shown in FIG. 2, the deblocking filtering operation performed by the deblocking filter 180 such that the number and/or position of pixels to be filtered in block P is different from the number and/or position of pixels to be filtered in block Q, by applying a predetermined criteria to rows of pixels included in the P and Q blocks.

Figure 4:
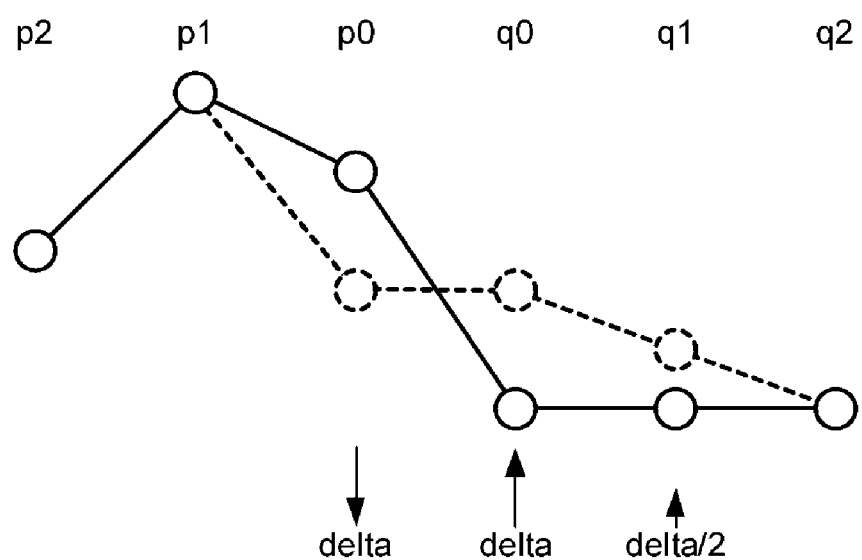
FIG. 4 is an exemplary diagram illustrating an implementation of a deblocking filtering according to at least one embodiment.

FIG. 4 is an exemplary diagram which illustrates a deblocking filtering operation according to at least one embodiment.

As shown in FIG. 4, an example of modifying one pixel in block P and two pixels in block Q relative to the block boundary is disclosed. Besides the pixel value adjustments with the same number (e.g., 2) of pixels on both sides of the P/Q block boundary as described above, some embodiments may have pixel adjustments with a different number of pixels to be adjusted on both sides of the boundary 202.

Referring to FIG. 4, block P has a prominent value at pixel p1 relative to the surrounding pixels, while the pixel values in block Q are smooth prior to filtering. In some embodiments, one or more images can be improved in subjective quality by filtering the closest pixel (p0) to the border on the block P side and filtering two border side pixels in the block Q side. In this embodiments, the numbers and positions of pixels subject to deblocking filtering by block P and block Q are differentiated.

In the example embodiment illustrated by FIG. 4, the specific filtering operation of the deblocking filter 180 is as follows.

After calculating values of delta by using Equation 1, the deblocking filter 180 is configured to perform deblocking filtering on a different number of block P pixels and block Q pixels as shown in Equation 4.

$$p_0' = p_0 - \Delta$$

$$q_0' = q_0 + \Delta$$

$$q_1' = q_1 + \Delta/2 \quad \text{Equation 4}$$

In this embodiment, the predetermined criteria (for determining the number and position of pixels to be filtered) may be defined in various ways, depending on the application of the present disclosure, for example by utilizing methods such as Equation 5, which measures the degree of linearity of pixels $d_p0$, $d_q0$.

$$d_{p0} = |p_2 - 2*p_1 + p_0| < \text{beta}$$

$$d_{q0} = |q_2 - 2*q_1 + q_0| < \text{beta} \quad \text{Equation 5}$$

In other words, with respect to the respective blocks P and Q, the pixel linearities (i.e., $d_{p0}$ and $d_{q0}$) are measured in the depth direction of subblocks about the block boundary 202, and the measurements are compared to a predetermined threshold (beta). For example, when condition ($d_{p0}$<beta) is satisfied, filtering is carried out on $p_1$; otherwise, no filtering is performed on the same. Likewise, when condition ($d_{q0}$<beta) is satisfied, filtering is carried out on $q_1$; otherwise, no filtering is performed on the same. In some embodiments, the threshold (beta) is set in various methods, and it may assumed to be prearranged between the video encoding apparatus 100 and video decoding apparatus 700, or provided by the degree of quantization or a downloaded value from a user (who is on the side of the video encoding apparatus 100 or video decoding apparatus 700), or set up by first defining a predetermined value or a quantization-dependent setpoint and subsequently adding thereto an offset adjustment as input by the user (with the offset transmitted from the video encoding apparatus 100 to the video decoding apparatus 700). In some embodiments, the offset value can also be transmitted to the video decoding apparatus 100 by using the deblocking filter 180 or a separate offset value transmission unit (not shown). Further, the depth direction of the subblocks corresponds to the direction of $p_0 \rightarrow p_1 \rightarrow p_2$ in block P from the block boundary and the direction of $q_0 \rightarrow q_1 \rightarrow q_2$ in block Q, as shown in FIG. 4.

FIG. 5 is an exemplary diagram of a degree of linearity determination in block units according to one or more embodiments.

In some embodiments, the above-described operation for determining pixels to filter by the predetermined criteria may be performed in units of rows of pixels as shown in Equation 5, or it may be performed as shown in FIG. 5 in block units (e.g., units of subblocks in a frame), or it may be applied as shown in Equation 6 where the resulting determination is applied to all the rows of pixels of the corresponding block.

$$d_{p0} = |p_{2,2} - 2*p_{1,2} + p_{0,2}| + |p_{2,5}2*p_{1,5} + p_{0,5}| < \text{beta}$$

$$d_{q0} = |q_{2,2} - 2*q_{1,2} + q_{0,2}| + |q_{2,5}2*q_{1,5} + q_{0,5}| < \text{beta} \quad \text{Equation 6}$$

The uniform application of filtering all pixels per block, as shown in Equation 6, in some embodiments, may disable making individual determinations for individual pixel rows, but the predetermined determination is not performed on every pixel row resulting in a faster operation. Referring to FIG. 2, where a group of pixels in eight rows makes up a block, an example of the application of Equation 6 is to use pixels within the second and fifth rows as the representative values of the block. In this example, one or more representative pixel rows may be selected within a subblock and the pixel linearities for the representative pixel rows may be used to obtain the subblock level of linearity.

For example, if block P is nonlinear, but block Q is linear, as shown in the example of FIG. 4, the nonlinearity of block P can be based on the image to justify the single pixel to be filtered in block P, while the characteristically high linearity of the image of block Q may justify the two pixels therein to be filtered, in order to maintain the desired linearity even after the deblocking filtering.

In this example, based on the predetermined criteria as shown in FIG. 4 and Equation 7, different delta values are applied according to the positions of the respective pixels (e.g., delta for the first pixel and delta/2 for the second pixel) to minimize the difference between the pixels ($p_0|q_0$) at the border 202 of the blocks P and Q, which minimizes the difference between the Q block pixels ($q_0|q_1$). Asymmetric values of delta relative to the boundary 202 are shown in Equation 7.

$$p_1' = p_1$$

$$p_0' = p_0 - \Delta$$

$$q_0' = q_0 + \Delta$$

$$q_1' = q_1 + \Delta/2 \quad \text{Equation 7}$$

Alternatively, the delta value for the first pixel $p_0$ in block P can be adjusted so as to minimize the difference between the pixels ($p_0|p_1$) in block P. For example, delta/2 may be applied to the first pixel of the block P as shown in Equation 8.

$$p_1'=p_1$$
$$p_0'=p_0-\Delta/2$$
$$q_0'=q_0+\Delta$$
$$q_1'=q_1+\Delta/2 \qquad \text{Equation 8}$$

In some embodiments, fixed pixel disparities (for example, a delta for the first pixel and delta/2 for the second pixel) may be used for the pixels subject to the deblocking filtering operation performed by deblocking filter 180 regardless of the pixel numbers and/or positions. In some embodiments, the pixel disparities may be variably used for the pixels subject to the deblocking filtering depending on the pixel numbers and/or positions, e.g., a delta is utilized for the first pixel of two pixels to be filtered and delta/2 is utilized for the remaining second pixel, and delta/2 is utilized for a single pixel to be filtered.

In addition, although some embodiments illustrate that up to two pixels are filtered, filtering one or a plurality (identifiable as V) of pixels in the manner disclosed herein will be understood by those skilled in the art. In some embodiments, the pixel disparities may be variably used for the pixels subject to the deblocking filtering operation performed by the deblocking filter 180 depending on the pixel numbers and/or positions, e.g., a delta for the first pixel of V pixels and delta/2 for the second pixel of the V pixels, and so on up to delta/V for the Vth pixel. In at least one embodiment, the pixel disparities may be obtained by multiplying a single delta by weights determined in accordance with the respective positions of the V pixels.

In some embodiments, the weighted values can be assumed to be previously determined respectively in the video encoding apparatus 100 and the video decoding apparatus 700 and they can be transmitted by the user (on the side of the video encoding apparatus 100). In some embodiments, the deblocking filtering operation can be performed by a method of calculating a new delta according to the number and/or position of each pixel.

Although linearity criteria as shown Equation 5 or 6 may be appropriate as the predetermined criteria for determining the number and positions of the pixels as described above, some embodiments (e.g., as when V is very large) may be provided with an additional criterion as that shown by Equation 9.

$$d_{p0}=|p_3-2*p_2+p_1|<\text{beta}$$
$$d_{q0}=|q_3-2*q_2+q_1|<\text{beta} \qquad \text{Equation 9}$$

FIG. 6 is an exemplary diagram of a degree of linearity determination in block units according to one or more embodiments.

Although the criterion in Equation 9 is applied to each row of pixels, it can be uniformly applied to each entire block by using Equation 10, as shown in FIG. 6.

$$d_{p0}=|p_{3,2}-2*p_{2,2}+p_{1,2}|+|p_{3,5}-2*p_{2,5}+p_{1,5}|<\text{beta}$$
$$d_{q0}=|q_{3,2}-2*q_{2,2}+q_{1,2}|+|q_{3,5}-2*q_{2,5}+q_{1,5}|<\text{beta} \qquad \text{Equation 10}$$

In some embodiments, a plurality of filters may be prepared with different properties (e.g., number and/or positions of pixels which engage in filtering, filtering strength, etc.) and different filters may be applied in a predetermined unit (e.g., in units of pixel row, block units and so on) based on a predetermined criteria. For example, in one embodiment, a single filter is configured to calculate the delta value as shown in Equation 1, and different pixel disparities are used to perform the deblocking filtering. In another embodiment, one or more filters with different properties as provided in Equation 1 and Equation 11 and different filters are applied in predetermined units based on the predetermined criteria. In some embodiments, the same filter coefficients are used for both the luminance signal (luma) and the color difference signals (chroma) to provide an implementation of the deblocking filtering operation.

$$\Delta=\text{Clip3}(-t_c, t_c, (13*(q_0-p_0)+4*(q_1-p_1)-5*(q_2-p_2)+16)>>5) \qquad \text{Equation 11}$$

In some embodiments, the predetermined criteria may be defined according to the properties of the filters. For example, the linearity shown in Equation 5 may be the criteria of the filtering determination, and such criteria as shown in Equation 9 may be added for the determination. In some embodiments, a whole new criteria may be defined.

In some embodiments, the predetermined criteria may be the relative block sizes of blocks P and Q and may be the forementioned linearities or the like. For example, the filtering method can be varied based on the subblock sizes or shapes (rectangle/square; horizontally extending rectangle, longitudinally extending rectangle or the like).

For example, the deblocking filter 180 can adaptively determine the target pixels to be used for filtering based on the prediction information (e.g., the intra prediction information or the inter prediction information). As used herein, the "intra prediction information" or the "inter prediction information" may refer to the sizes or shapes of the subblocks. In addition, the prediction information in the case of the inter prediction may be information on the motion vector, the reference index or the like as used in the inter prediction.

Figure 8:
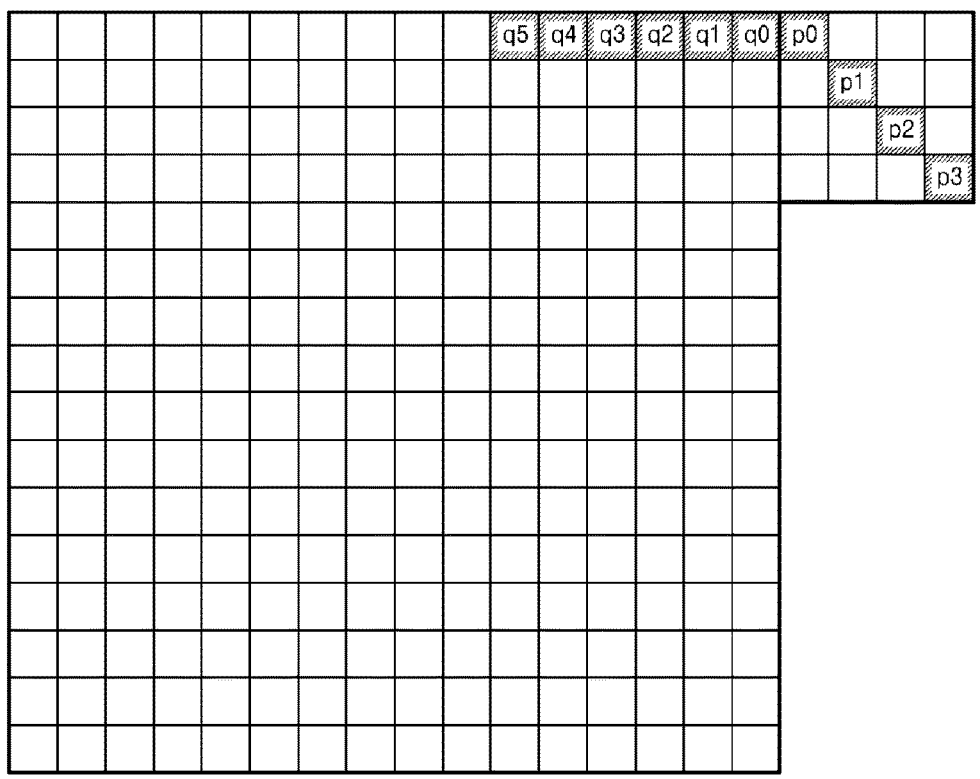
FIG. 8 is an exemplary diagram of a process for determining the target pixel to be filtered according to at least one embodiment.

As illustrated in FIG. 8, if the blocks P and Q have a different number of pixels to be filtered, different methods of filtering can be used respectively for the block P and the block Q. In some embodiments, the number of pixels to be filtered can be determined based on the size of the intra prediction block included in the intra prediction information.

FIG. 8 is an exemplary diagram illustrating pixels filtered in block P and Q in accordance with one or more embodiments. As shown in FIG. 8, the number of pixels filtered in block P are four and the number of pixels filtered in block Q are six. In some embodiments, determining the number of target pixels for filtering can be based on the size of the intra prediction block included in the intra prediction information. For example, pixels to be filtered in block P can be two and those in block Q become four.

Further, the deblocking filter 180 can determine the positions of the target pixels (i.e., the filtering direction) based on the orientation or directionality of the intra prediction mode included in the intra prediction information.

Figure 7:
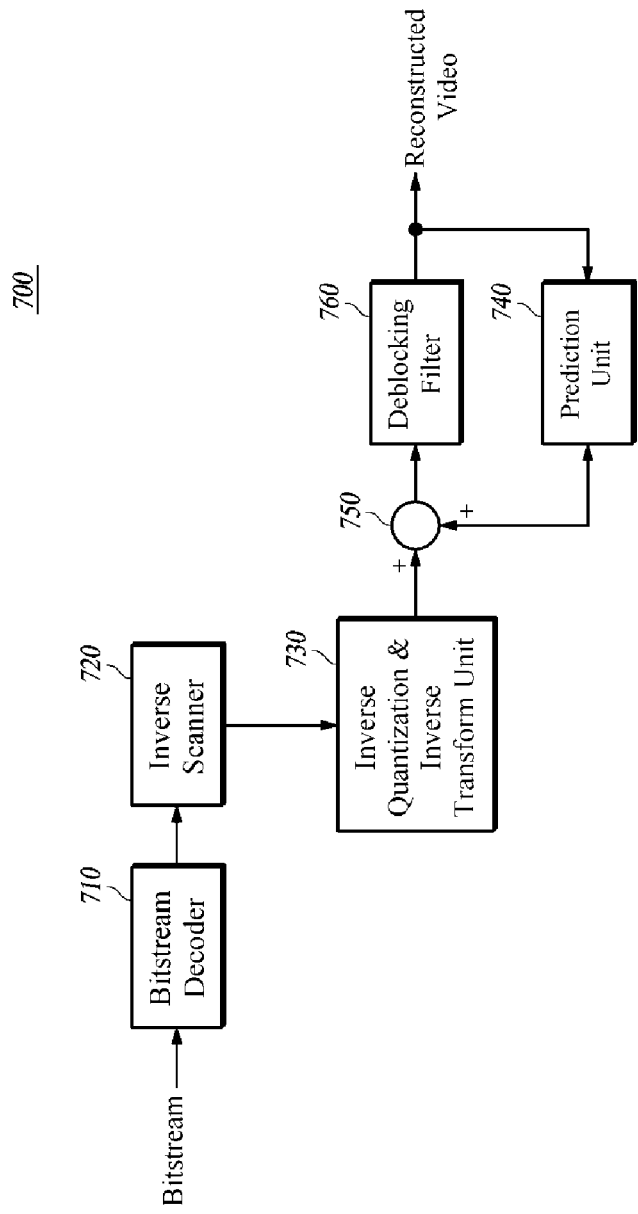
FIG. 7 is a block diagram of a configuration of a video decoding apparatus according to at least one embodiment.

FIG. 7 is a block diagram of a configuration of an image decoding apparatus 700 according to one or more embodiments.

The video decoding apparatus 700 according to at least one embodiment of the present disclosure may comprise a bitstream decoder 710, an inverse scanner 720, an inverse quantization & inverse transform unit 730, a prediction unit 740, an adder 750 and a deblocking filter 760. In some embodiments, one or more components may be selectively omitted according to the method of implementation. For example, if the inverse scanner 720 is omitted, its function may be incorporated and performed in the bitstream decoder 710.

The bitstream decoder 710 decodes the encoded data to reconstruct the residual blocks which have been transformed and quantized. In some embodiments, the bitstream decoder is configured to decode the encoded data to reconstruct a quantized transform coefficient string. In some embodiments, where inverse scanner 720 is not included in video decoding apparatus 700, the bitstream decoder 710 may incorporate the functionality of the inverse scanner 720. In these embodiments, the bitstream generator 150 of the video encoding apparatus 100 is implemented to incorporate the functionality of the scanner 140. The bitstream decoder 710 may inversely scan the reconstructed quantized transform coefficient string to reconstruct the transformed and quantized residual blocks.

In addition to reconstructing the transformed and quantized residual blocks, the bitstream decoder 710 can decode or extract information required for the decoding operation. The information required for decoding comprises information required for decoding the encoded bitstream in the encoded data, such as information on the block type, intra prediction mode when it is decided as the prediction mode, motion vector when inter prediction mode is decided as the prediction mode, transform and quantization types and the like, although various other information may be included.

In some embodiments, the information on the block type may be transmitted to the inverse quantization & inverse transform unit 730 and the prediction unit 740. In some embodiments, the information on the transform and quantization types may be transmitted to the inverse quantization & inverse transform unit 730. In some embodiments, information required for the prediction such as intra prediction mode information and motion vector information may be transmitted to the prediction unit 740.

Upon receiving the reconstructed transform coefficient string transferred from the bitstream decoder 710, the inverse scanner 720 inversely scans the reconstructed transform coefficient string to reconstruct the transformed and quantized residual blocks.

In some embodiments, the inverse scanner 720 inversely scans the extracted quantization coefficient string with various inverse scanning methods of an inverse zigzag scanning and others to generate the residual blocks having quantized coefficients. In some embodiments, the inverse scanning method is adapted to obtain information on the transform size from the bitstream decoder 710 and reconstruct the residual blocks by using the corresponding inverse scanning method.

In some embodiments, when the bitstream generator 150 is implemented to incorporate the functionality of the scanner 140 in the video encoding apparatus 100, the bitstream decoder 710 may incorporate the functionality of the inverse scanner 720. In some embodiments, the bitstream decoder 710 or the inverse scanner 720 inversely scans the transformed and quantized residual blocks according to the transform and quantization types identified by the reconstructed information on the same. In some embodiments, the inverse scanning method performed by the inverse scanner 720 is a substantial inverse of the scanning method performed by the scanner 140 in the video encoding apparatus 100 for scanning the quantized transform coefficients of the transformed and quantized residual blocks, and therefore the detailed description for the inverse scanning method will be omitted.

The inverse quantization & inverse transform unit 730 reconstructs the residual blocks by inversely quantizing and inversely transforming the reconstructed transformed and quantized residual blocks. In some embodiments, the inverse quantization & inverse transform unit 730 is configured to perform the inverse quantization & inverse transform operation according to the transform and quantization types identified by information transmitted from the bitstream decoding unit 710. In some embodiments, the inverse quantization & inverse transform operation performed on the transformed and quantized residual blocks according to the transform and quantization types by the inverse quantization & inverse transform unit 730 is a substantial inverse of the transform & quantization operation performed according to the transform and quantization types by the transform & quantization unit 130 in the video encoding apparatus 100, and therefore the detailed description for the inverse quantization & inverse transform method will be omitted.

The prediction unit 740 generates a prediction block of the current block. In some embodiments, the prediction unit 740 predicts the current block by using block type information and the information required for the prediction, which are transmitted from the bitstream decoder 710. In some embodiments, the prediction unit 740 determines the size and the shape of the current block according to the block type identified by block type information, and predicts the current block to generate a prediction block by using the intra prediction mode or motion vector identified by the information required for the prediction. In some embodiments, the prediction unit 740 can generate the prediction block by partitioning the current block into subblocks, predicting each subblock, generating prediction subblocks and then combining the prediction blocks.

The adder 750 reconstructs the current block by adding the prediction blocks generated in the prediction unit 740 to the residual blocks reconstructed by the inverse quantization & inverse transform unit 730.

The deblocking filter 760 filters the current block reconstructed by the adder 750. In some embodiments, the reconstructed and filtered current blocks are accumulated in units of pictures and stored as a reference picture in a memory (not shown). In some embodiments, the prediction unit 740 uses the reference picture when predicting the subsequent block or picture.

The deblocking filter 760 filters the current block reconstructed by the adder 750. The method performed by the deblocking filter 760 for filtering the reconstructed current block is substantially similar to the method for filtering the current block by the deblocking filter 180 in the video encoding apparatus 100, and therefore further detailed description thereof will be omitted.

In some embodiments, if the filtering parameter used by the deblocking filtering is set as a predetermined value, the video decoding apparatus 700 may comprise an offset value receiver (not shown) for receiving an offset value for the corresponding parameter as it is transmitted on bitstream from the video encoding apparatus. The deblocking filter 760 can perform the deblocking filtering by using the offset value received at the offset value receiver. In some embodiments, the offset value receiver may be configured as an independent module or can be functionally incorporated into the bitstream decoder 710.

In some embodiments, the video encoding/decoding apparatus according to some embodiments of the present disclosure can be realized by connecting a bitstream or encoded data output terminal of the video encoding apparatus 100 of FIG. 1 to a bitstream input terminal of the video decoding apparatus 700 of FIG. 7.

In some embodiments, it has been described that the block boundary to be filtered is the boundary between the left block and the right block, but a similar manner of filtering may be performed on the boundary between the lower block and the upper block.

In some embodiments, the number and/or positions of target pixels subject to the deblocking filtering or the deblocking filtering method is either identically or differently defined for the P blocks and the Q blocks based on predetermined criteria to improve the encoding/decoding efficiency.

In the description above, although each of the components of the embodiments of the present disclosure may have been explained as assembled or operatively connected as a unit, one of ordinary skill would understand the present disclosure is not limited to such embodiments. Rather, within some embodiments of the objective scope of the present disclosure, the respective components are selectively and operatively combined in any numbers of ways. In some embodiments, each of the components is capable of being implemented alone in hardware or combined in part or as a whole and implemented in a computer program having program modules residing in computer readable media and causing a processor or microprocessor to execute functions of the hardware equivalents. The computer program is stored in a non-transitory computer readable media, which in operation realizes at least one embodiment of the present disclosure. The computer readable media includes, but are not limited to, magnetic recording media and optical recording media in some embodiments.

In addition, one of ordinary skill would understand terms like 'include', 'comprise', and 'have' to be interpreted in default as inclusive or open-ended rather than exclusive or close-ended unless expressly defined to the contrary. All terms that are technical, scientific or otherwise agree with meanings as understood by a person skilled in the art remain so unless defined to the contrary.

Although exemplary embodiments of the present disclosure have been described for illustrative purposes, those skilled in the art will appreciate that various modifications, additions and substitutions are possible, without departing from the spirit and scope of the claimed invention. Specific terms used in this disclosure and drawings are used for illustrative purposes and not to be considered as limitations of the present disclosure. Therefore, exemplary embodiments of the present disclosure have been described for the sake of brevity and clarity. Accordingly, one of ordinary skill would understand the scope of the claimed invention is not to be limited by the explicitly described above embodiments.

What is claimed is:

1. A video decoding method, comprising:
   generating a quantized frequency transform block by decoding a bitstream;
   reconstructing a residual block by inversely quantizing and inversely transforming the quantized frequency transform block;
   generating a prediction block corresponding to a current block;
   reconstructing the current block by adding the generated prediction block to the reconstructed residual block; and
   performing a deblocking filtering with respect to a boundary between subblocks within a frame including the reconstructed current block, by allowing numbers of filtered pixels in a first subblock of the subblocks and a second subblock of the subblocks that engage in the filtering to be different depending on one or more predetermined criterion,
   wherein the performing the deblocking filtering is configured to perform the filtering by applying different pixel disparity values on the first subblock or the second subblock according to pixel positions relative to the boundary between the first subblock and the second subblock,
   wherein the performing the deblocking filtering is configured to
      calculate a first pixel disparity value corresponding to a first position from the boundary using a first offset value, and
      calculate a second pixel disparity value corresponding to a second position from the boundary using a second offset value,
   wherein the first offset value and the second offset value are decided irrelevant to pixel values of the first subblock or the second subblock,
   wherein the one or more predetermined criterion comprises a linearity of a subblock unit in a direction of depth from the boundary between the first subblock and the second subblock, and
   wherein the linearity of the subblock unit is obtained by selecting two representative rows for the subblock unit and summing linearities of two representative rows.

2. The video decoding method of claim 1, wherein the number of filtered pixels in a subblock determined to be linear is greater than the number of filtered pixels in a subblock determined to be nonlinear.

3. The video decoding method of claim 1, further comprising receiving an offset value of a filtering parameter of the deblocking filtering.

* * * * *